(12) United States Patent
Cote

(10) Patent No.: US 9,609,852 B2
(45) Date of Patent: Apr. 4, 2017

(54) LANTERN SHAPED BIRD FEEDER

(71) Applicant: Brome Bird Care Inc., Lac Brome (CA)

(72) Inventor: Paul L. Cote, Lac Brome (CA)

(73) Assignee: Brome Bird Care Inc., Lac Brome, Quebec (CA)

( * ) Notice: Subject to any disclaimer, the term of this patent is extended or adjusted under 35 U.S.C. 154(b) by 123 days.

(21) Appl. No.: 14/120,725

(22) Filed: Jun. 20, 2014

(65) Prior Publication Data

US 2015/0366168 A1 Dec. 24, 2015

(51) Int. Cl.
*A01K 39/012* (2006.01)
*A01K 39/01* (2006.01)
*A01K 39/014* (2006.01)

(52) U.S. Cl.
CPC ........ *A01K 39/012* (2013.01); *A01K 39/0113* (2013.01); *Y10T 29/49842* (2015.01)

(58) Field of Classification Search
CPC ............ A01K 39/0106; A01K 39/0102; A01K 39/01; A01K 39/0113
See application file for complete search history.

(56) References Cited

U.S. PATENT DOCUMENTS

| | | | | |
|---|---|---|---|---|
| 2,856,898 | A * | 10/1958 | Doubleday | A01K 39/0113 119/57.9 |
| 5,195,459 | A * | 3/1993 | Ancketill | A01K 39/0113 119/52.3 |
| 6,945,192 | B2 * | 9/2005 | Cote | A01K 39/0113 119/57.9 |
| 7,219,621 | B2 * | 5/2007 | Coroneos | A01K 39/0113 119/51.01 |
| 8,230,809 | B2 * | 7/2012 | Cote | A01K 39/0113 119/52.3 |
| 2005/0257749 | A1 * | 11/2005 | Kuelbs | A01K 39/00 119/57.8 |
| 2006/0118055 | A1 * | 6/2006 | Kuelbs | A01K 39/00 119/57.8 |
| 2006/0272586 | A1 * | 12/2006 | Hunter | A01K 31/06 119/57.8 |
| 2009/0260576 | A1 * | 10/2009 | Vosbikian | A01K 39/012 119/52.2 |
| 2012/0037080 | A1 * | 2/2012 | Hepp | A01K 39/0113 119/52.3 |
| 2014/0311413 | A1 * | 10/2014 | Hoysak | A01K 39/0113 119/61.1 |
| 2015/0144065 | A1 * | 5/2015 | Chen | A01K 39/0106 119/51.03 |

* cited by examiner

*Primary Examiner* — Monica Williams
*Assistant Examiner* — Christopher Hutchens
(74) *Attorney, Agent, or Firm* — Eric Fincham

(57) ABSTRACT

A bird feeder comprising a seed container, a center tube formed within the seed container, a seed tray, an independently calibrated cartridge spring assembly having a center rod, a spring extending about the center rod with the center rod extending downwardly of said center tube, a cover, and a hanger engaged with an upper portion of the center tube to thereby retain the cover in position, a shroud having a perch member and a central opening therein to permit the lower end of the center rod to pass therethrough, and a retainer secured to the lower end of the spring assembly.

9 Claims, 23 Drawing Sheets

LANTERN SHAPED BIRD FEEDER

FIELD OF THE INVENTION

The present invention to squirrel proof bird feeders.

BACKGROUND OF THE INVENTION

The feeding of birds by means of bird feeders is well known in the art. The bird feeders can range from simple tube type feeders to those having designs to permit the exclusion of heavier birds and/or marauders such as squirrels. Exemplary of the latter type of bird feeders are those shown in U.S. Pat. Nos. 6,543,384, 7,739,982 and 8,230,809, the teachings of which are hereby incorporated by reference.

Although the above mentioned bird feeders work as described therein, one of the problems associated with such bird feeders is the calibration of the spring mechanism. The spring mechanism is the means by which a shroud is moved to permit or deny access to the contents of the seed container. While some of the structures permit adjustment of the spring tension, others are fixed at a predetermined level.

As shown in some of these patents, a weight activated closure system is based on a tension spring system. The tension spring holds the shroud in an open position and is biased against the seed container assembly. Inherent in this design is the need for top and bottom stops to hold the spring under tension. The spring is tensioned and held in tension by the compression of the spring when the bird feeder components are assembled and fastened.

SUMMARY OF THE INVENTION

It is an object of the present invention to provide a spring cartridge assembly wherein the tension spring is incorporated in an assembly independent of the bird feeder components.

According to one aspect of the present invention, there is provided a bird feeder comprising a seed container, a center tube within the seed container, a seed tray, a cartridge spring assembly comprising a center rod, a spring extending about the center rod, the spring assembly fitting within the center tube and the center rod extending outwardly at a lower end thereof, a cover, the cover having an aperture, the center tube passing through the aperture, a hanger, the hanger being engaged with an upper portion of the center tube to thereby retain the cover in position, a shroud having a perch member, a central opening in the shroud to permit a lower end of the center rod to pass therethrough, and a retainer secured to the lower end of the spring assembly to retain the shroud in position.

The cartridge system permits the calibration of the spring system before assembly which increases production efficiency and reduces production costs. Rather than calibrating after assembly, which may require disassembly and reassembly to correct non conforming springs, the cartridge system permits the calibration before assembly. This also permits the consumer to replace defective springs as the replacement cartridge assembly is replaced as a unit.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
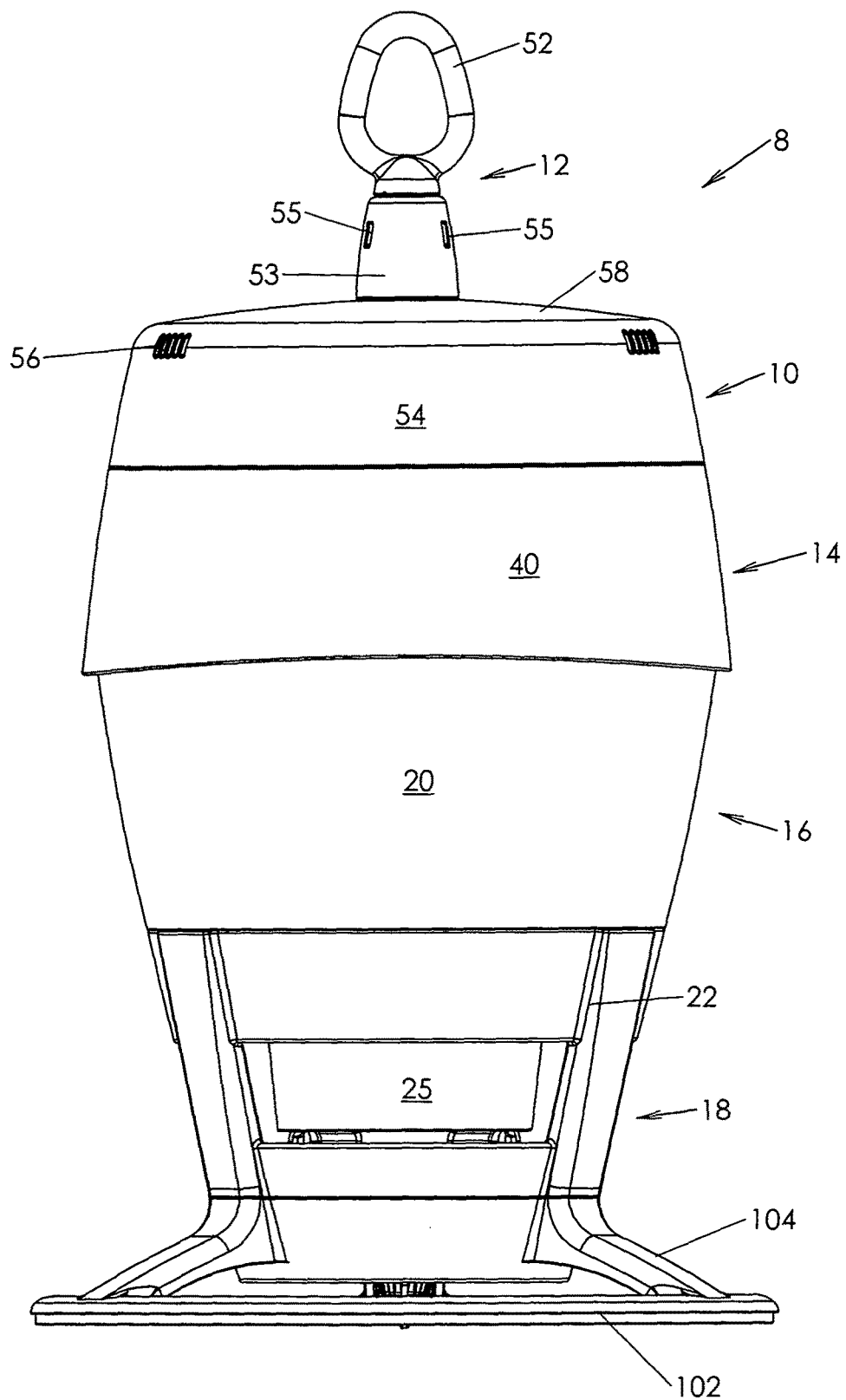
FIG. 1 is a side elevational view of a bird feeder according to an embodiment of the present invention.
Figure 2:
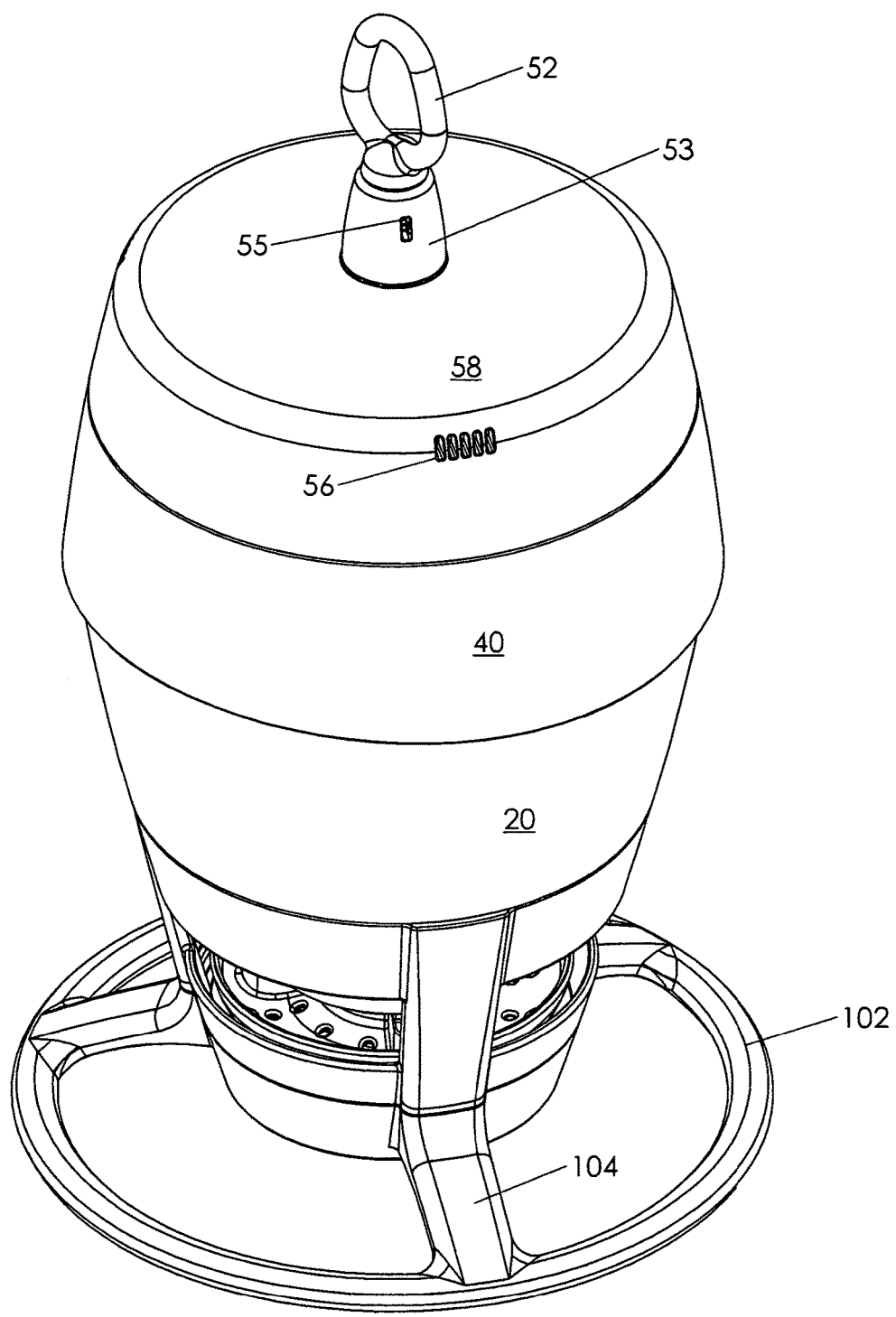
FIG. 2 is a perspective view thereof.
Figure 3:
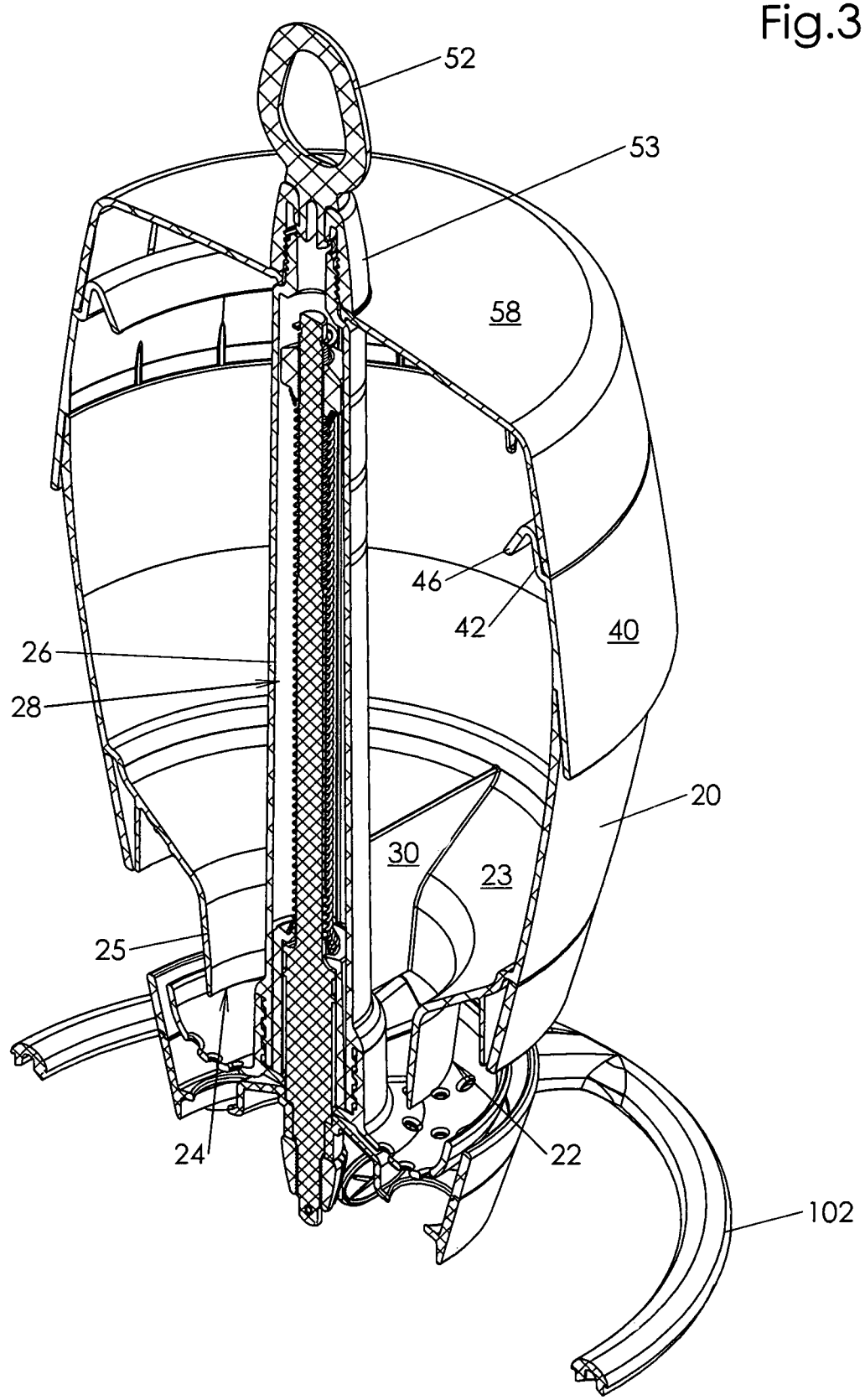
FIG. 3 is a sectional view thereof.
Figure 4:
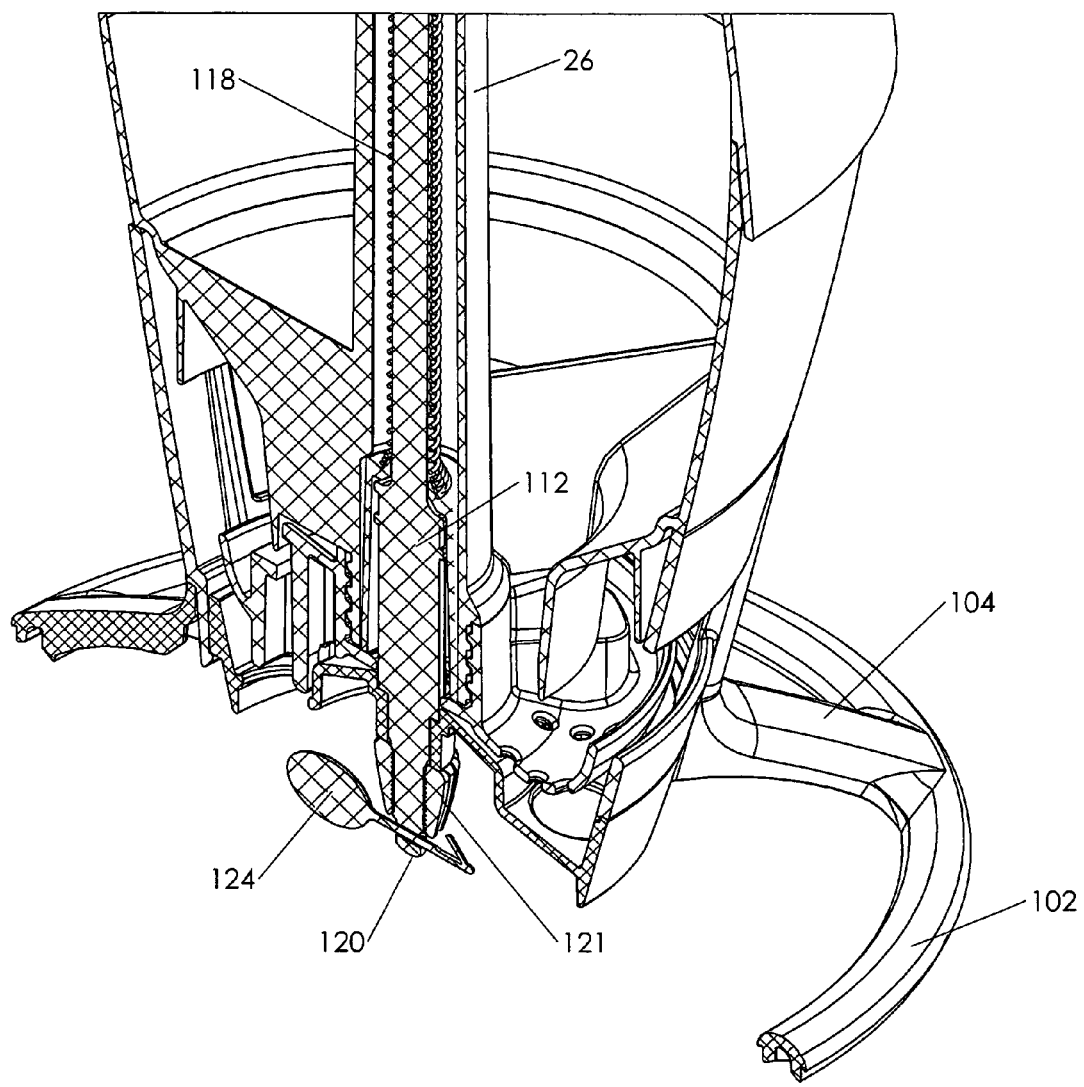
FIG. 4 is an enlarged view of the bottom portion of the bird feeder in a sectional view.
Figure 5:
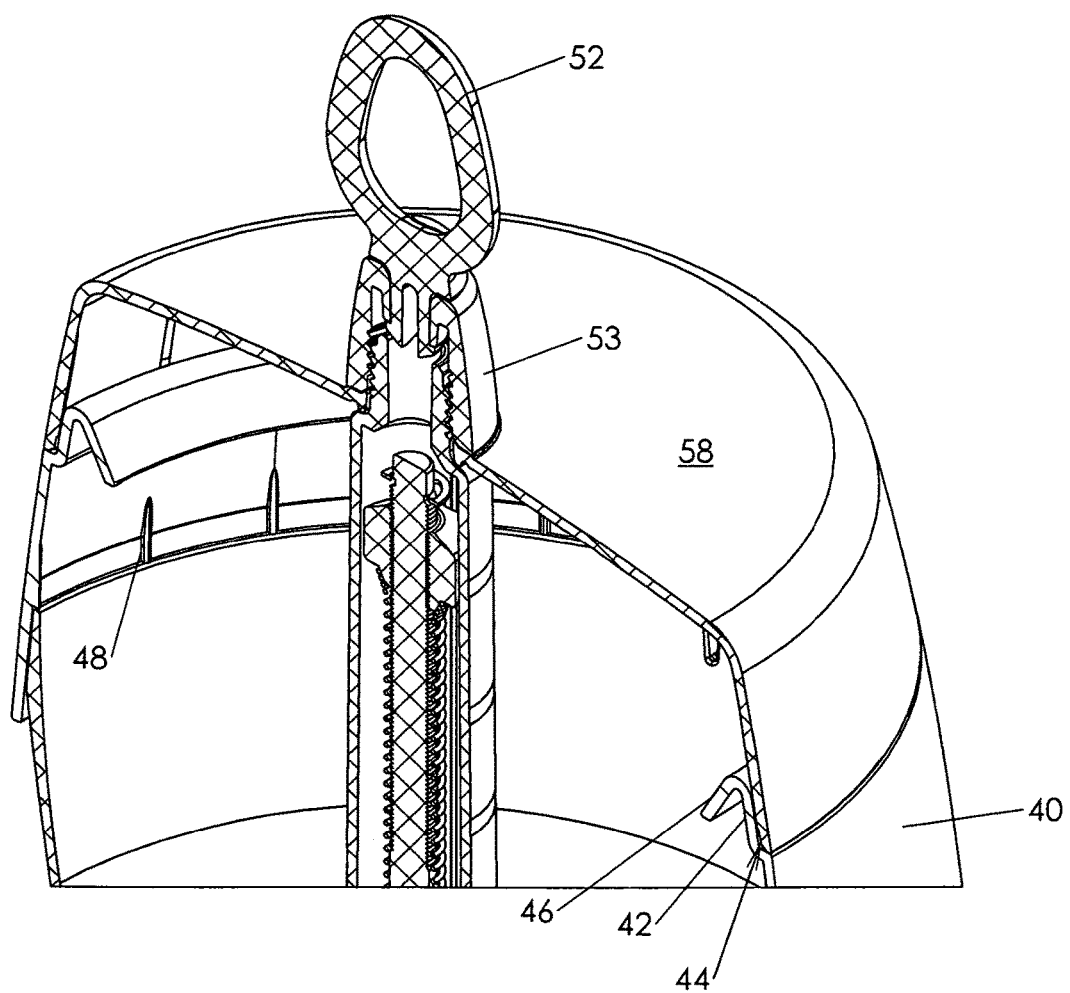
FIG. 5 is an enlarged sectional view of the top portion of the bird feeder.
Figure 6:
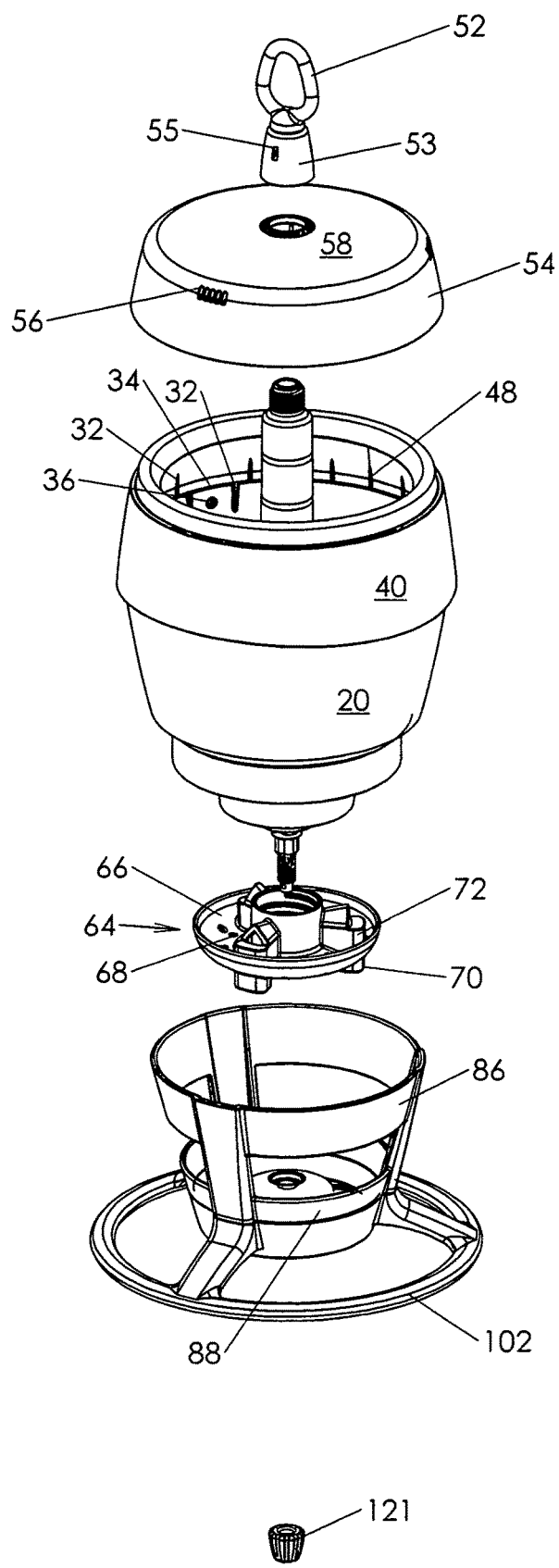
FIG. 6 is an exploded view of the bird feeder.
Figure 7:
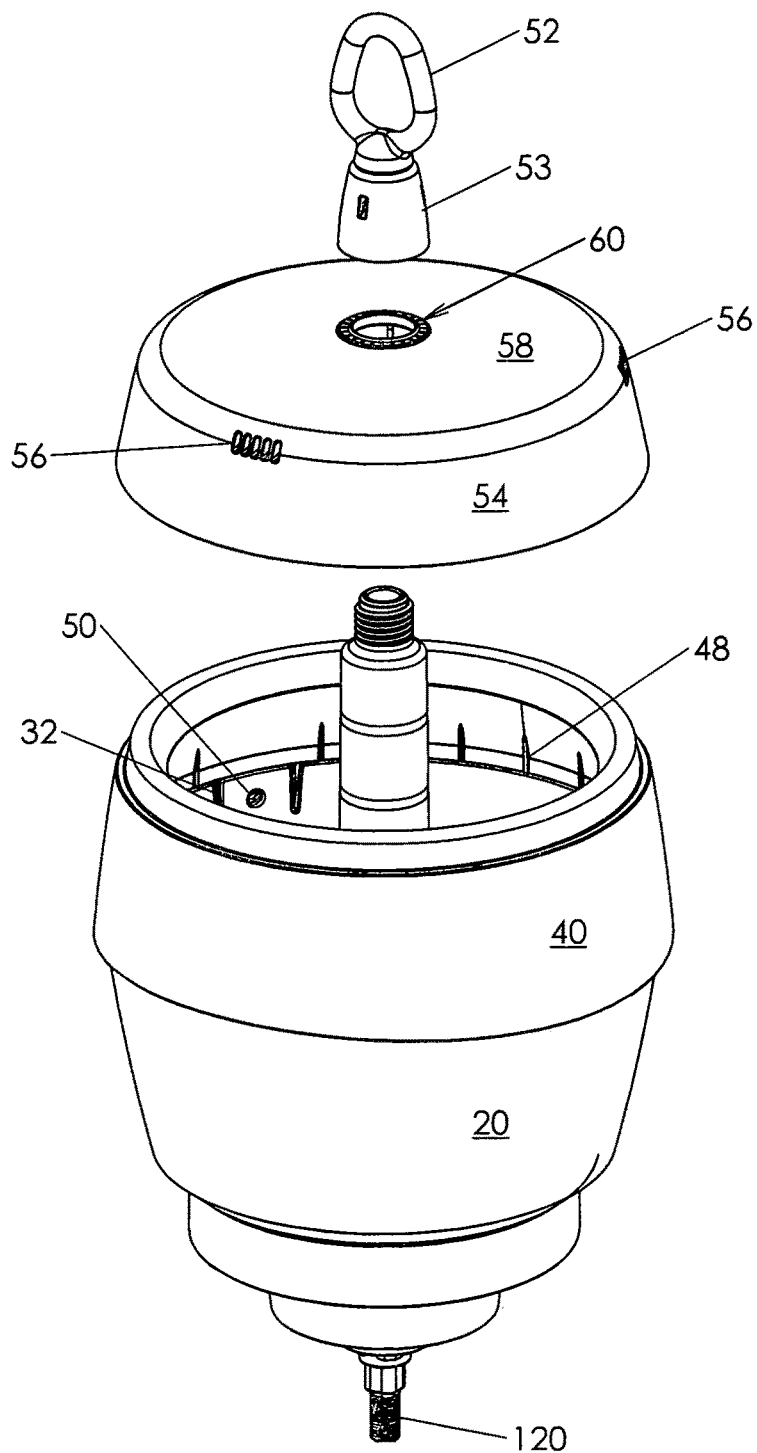
FIG. 7 is a partially exploded view illustrating the hanger and cover of the bird feeder.
Figure 8:
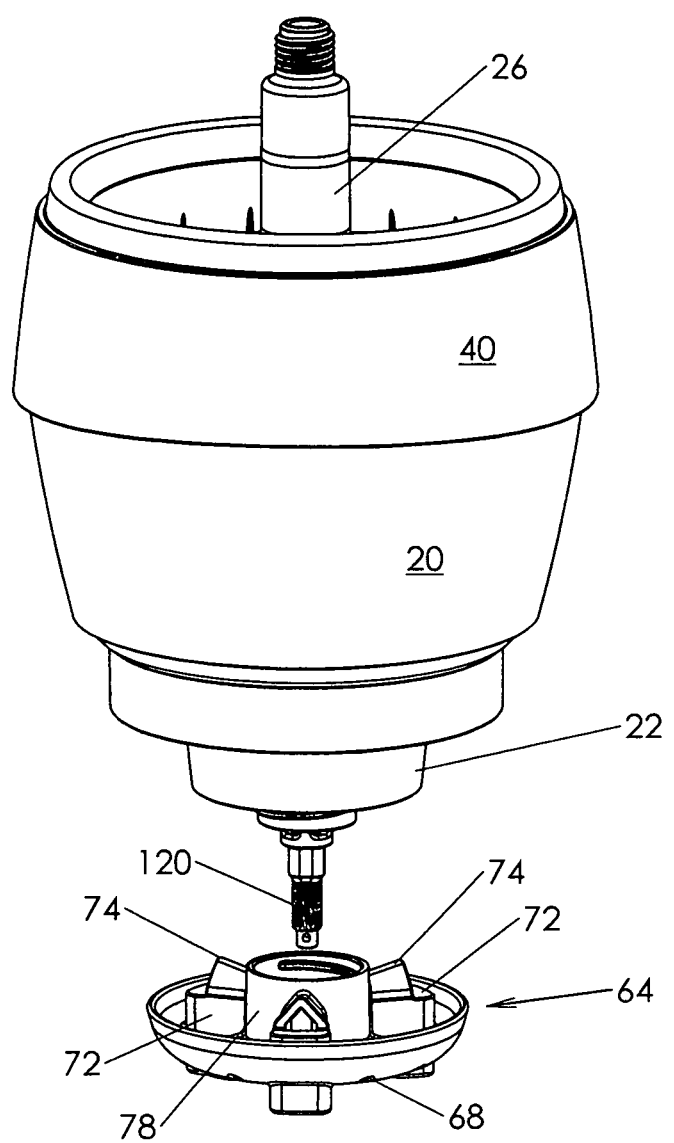
FIG. 8 is a perspective partially exploded view of the seed container and seed tray.
Figure 9:
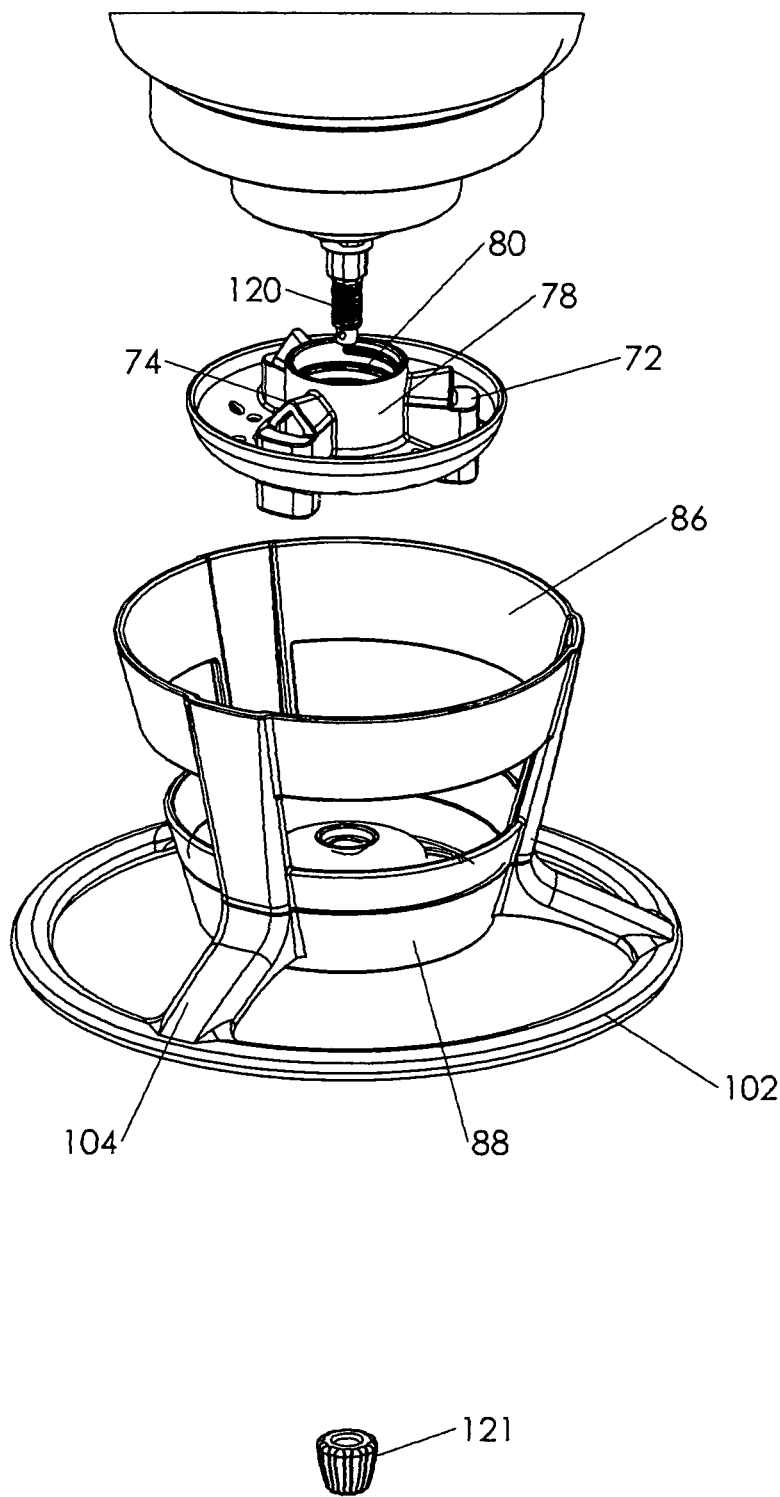
FIG. 9 is a partially exploded view of the bottom portion of the bird feeder.
Figure 10:
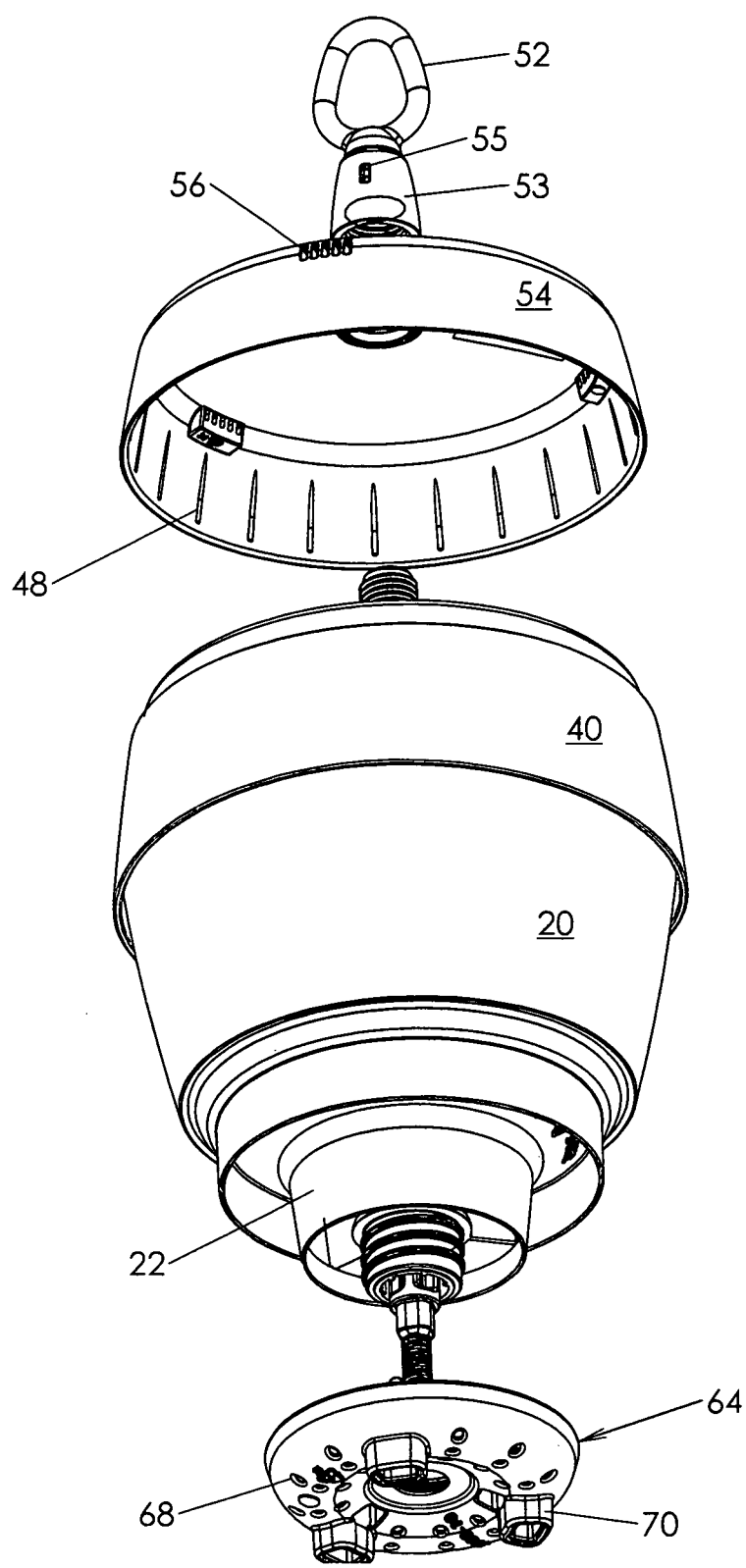
FIG. 10 is a bottom perspective view of the bird feeder without the shroud.
Figure 11:
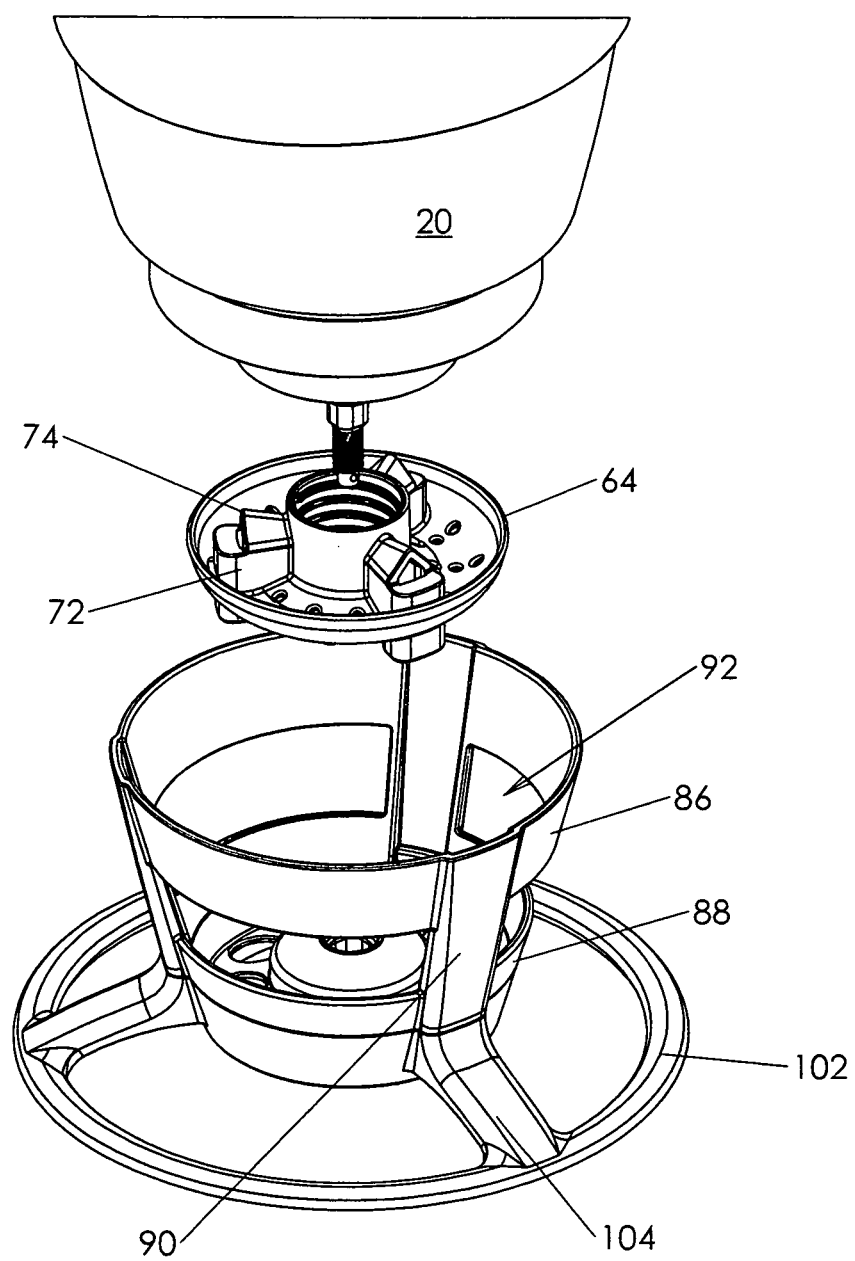
FIG. 11 is a perspective view of the bottom portion of the feed container illustrating the shroud and seed tray.
Figure 12:
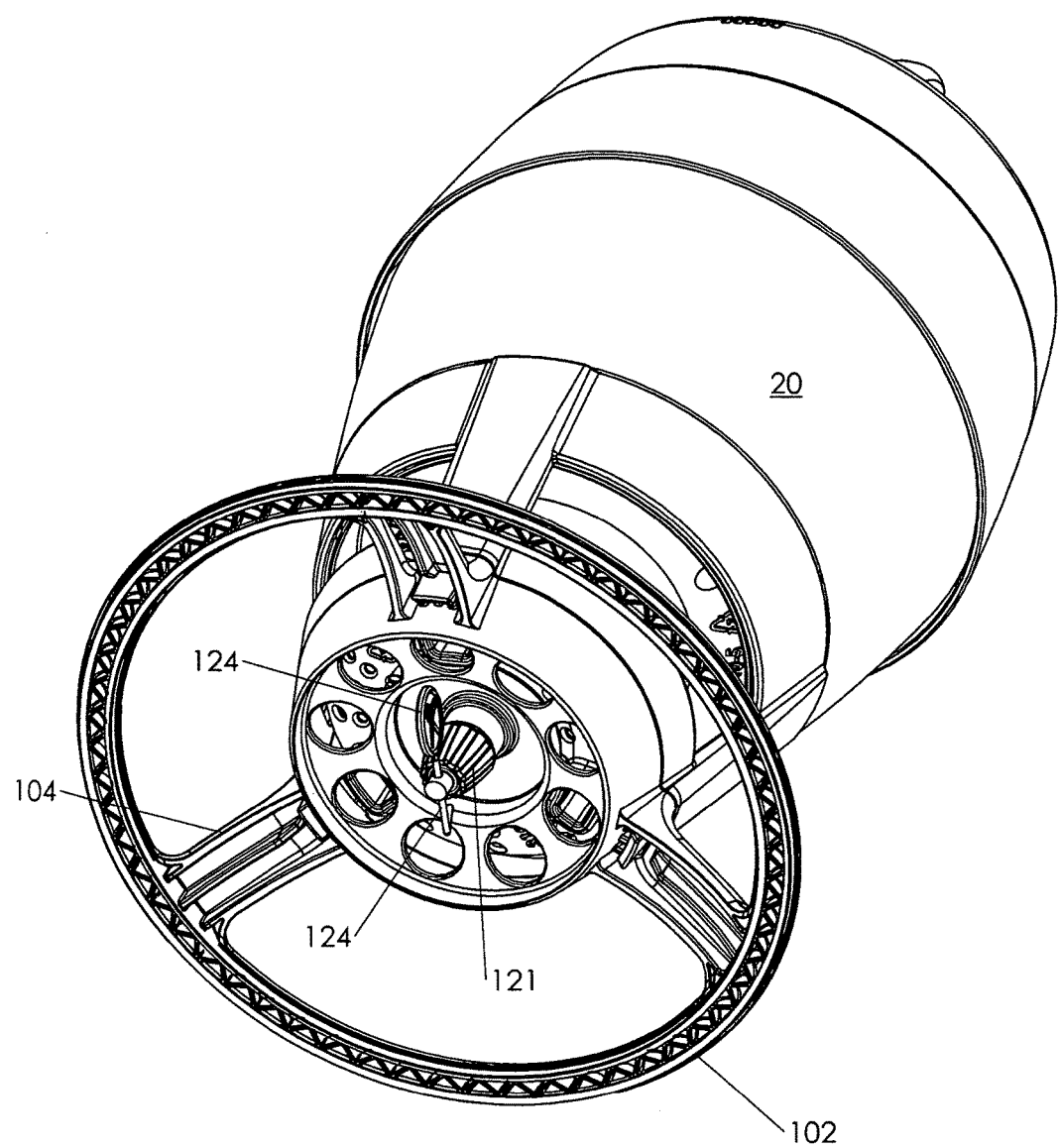
FIG. 12 is a bottom perspective view of the bird feeder.

Referring to the drawings in greater detail and by reference characters thereto, there is illustrated a bird feeder which is generally designated by reference numeral 8. Bird feeder 8 includes a cover generally designated by reference numeral 10, a hook structure generally designated by reference numeral 12, an upper body generally designated by reference numeral 14, a seed container generally designated by reference numeral 16, and a shroud generally designated by reference numeral 18.

Seed container 16 is defined by a side wall 20. A lower section generally designated by reference numeral 22 has an inwardly tapering wall 23 terminating in a generally circular outline 25. Portion 25 surrounds a seed outlet 24 and assists in preventing access to the feeder when the shroud is closed.

A center tube 26 has an interior passageway or cavity 28. Center tube 26 is preferably molded integrally with seed container 16 and has reinforcing flanges 30. At the upper edge of side wall 20 there are provided pairs of slits 32 to define a tab 34. A centrally located aperture 36 is formed in each tab 34.

Upper body 14 is comprised of a side wall 40 which communicates with an upper wall section 42. A ledge 44 is formed intermediate side wall 40 and upper wall section 42. Upper wall section 42 continues on to form a diagonally inwardly extending wall 46. A plurality of linear protrusions 48 are sized such that they abut the top of side wall 20 when upper body 14 is placed in position. There are also provided circular protrusions 50 which are designed to mate with apertures 36 formed in tabs 34.

Cover 10 is designed to seat on top of upper body 14. Cover 10 has a side wall 54 with venting apertures 56 formed therein. Side wall 54 seats on ledge 44. Cover 10 also includes a top wall 58 having a central aperture 60 located therein. The portion around central aperture 60 is textured for reasons which will become apparent hereinbelow.

Hook structure 12 includes a hook element 52 which will function to permit the bird feeder to be hung. There is also an engaging portion 53; hook element 52 is rotatable with respect to engaging portion 53 and has interior threads formed thereon. Ventilation apertures 55 are provided to vent center tube 26.

A seed tray 64 has a bottom wall 66 with drainage apertures 68 formed therein. Seed tray 64 sits below seed container 16 to receive seeds thereon. Seed tray 64 includes legs 70 which continue on the upper side as projections 72. Each projection 72 has an inverted V-shaped surface 74 to distribute the seed.

Seed tray 64 also includes, on the upper side thereof, a center wall 78 having threads 80 formed internally thereof. There is also provided a central aperture 82.

Shroud 18 has a solid upper side wall 86 and a solid lower side wall 88. Upper side wall 86 and lower side wall 88 are connected by vertical elements 90 with openings 92 being therebetween. Shroud 18 also has a bottom wall 94 with relatively large apertures 96 located therein. A center structure 98 includes a rectangular aperture 100 therein. A circular perch 102 is connected to lower side wall 88 by connecting members 104.

A spring cartridge 103 is located interiorly of center tube 26 and includes a center rod 108. Center rod 108 has threads 110 on an upper portion thereof. The lower portion includes a base 112 which is surrounded by a moveable cap 113. Cap 113 sits on a top wall 114 of base 112. Base 112 is thicker and thus provides reinforcement when the shroud is in the closed position.

A nut 116 is engageable with threads 110 and a coil spring 118 surrounds center rod 108 between nut 116 and cap 113.

Center rod 108 includes a bottom extension generally designated by reference numeral 120. The bottom extension 120 includes threads 119 thereon for engagement with a nut 121. An aperture 122 is designed to receive a pin 124.

Figure 23:
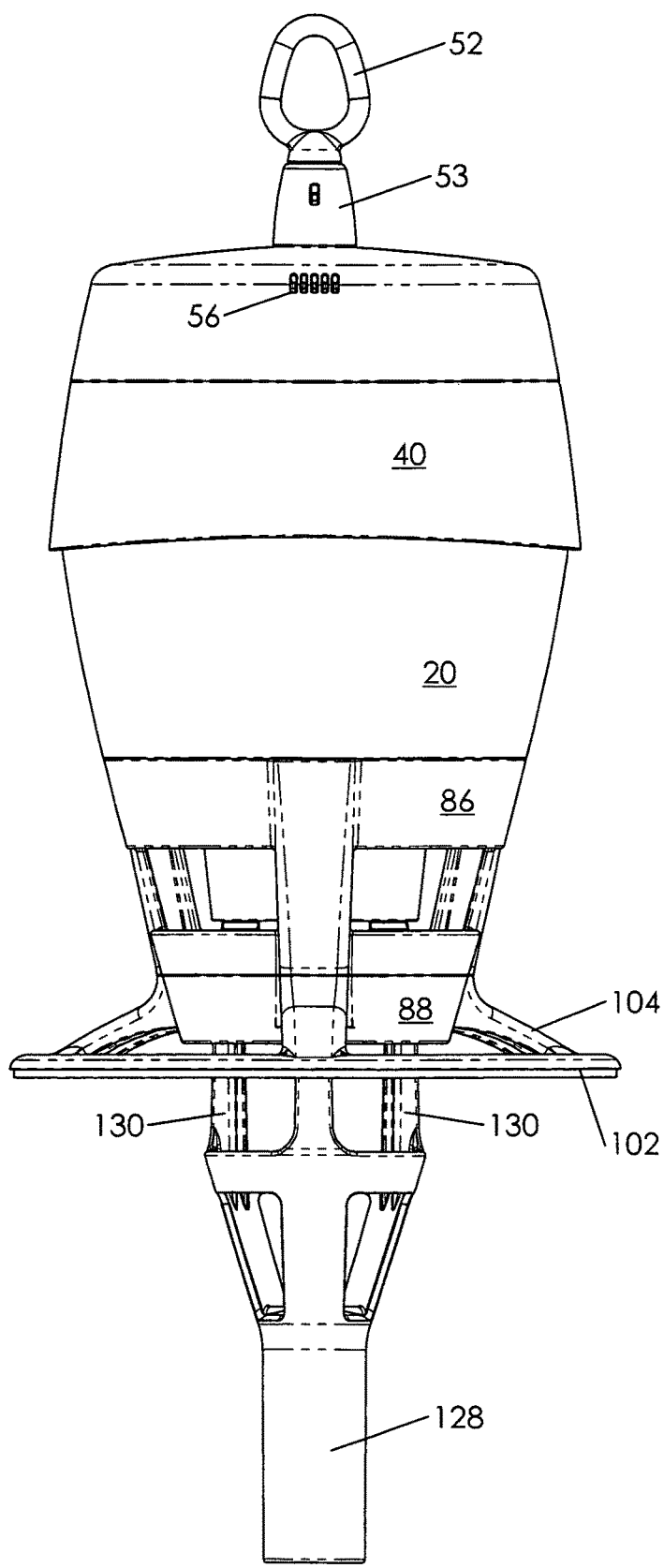
FIG. 23 is a side elevational view of the bird feeder mounted on a member.

If desired, the bird feeder 8 can also be supported by a pole. Thus, as shown in FIG. 23, a post 128 may have a plurality of arms 130 which would extend into and through apertures 96 in shroud 84.

Figure 13:
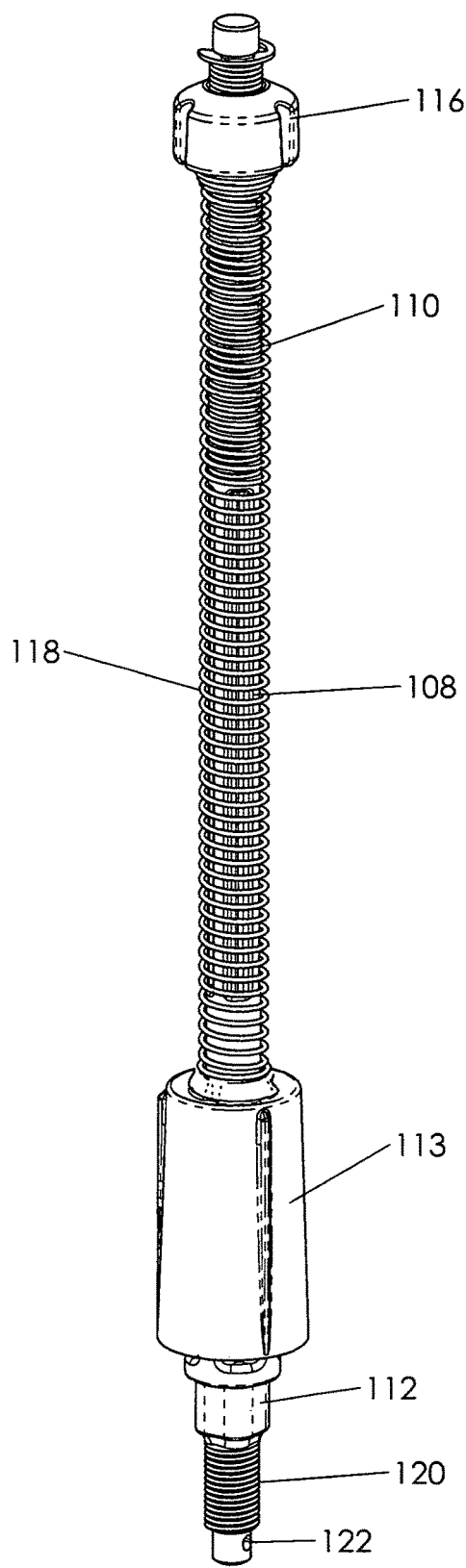
FIG. 13 is a perspective view of the spring cartridge.
Figure 14:
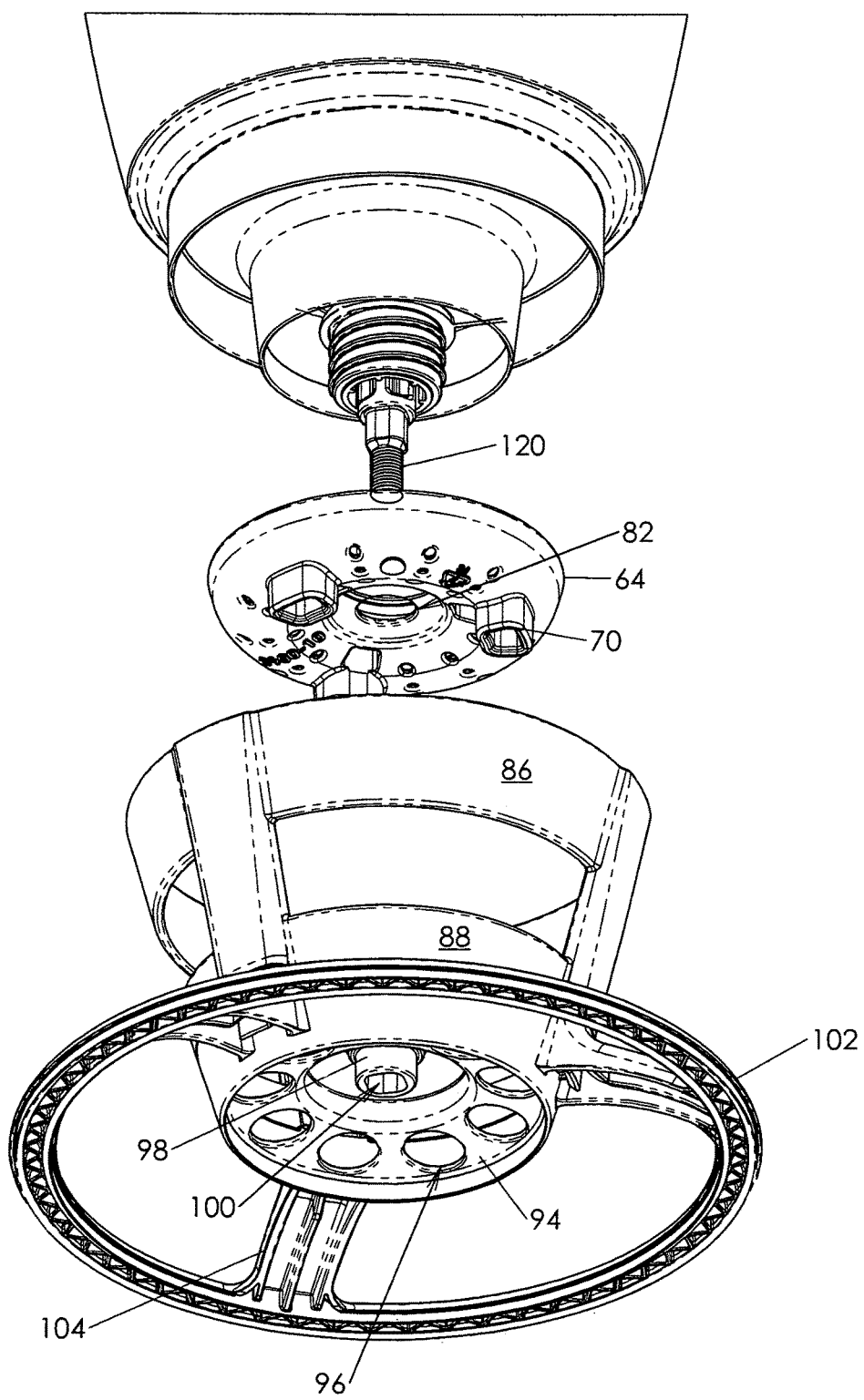
FIG. 14 is a partially exploded view of the bottom portion of the bird feeder.
Figure 15:
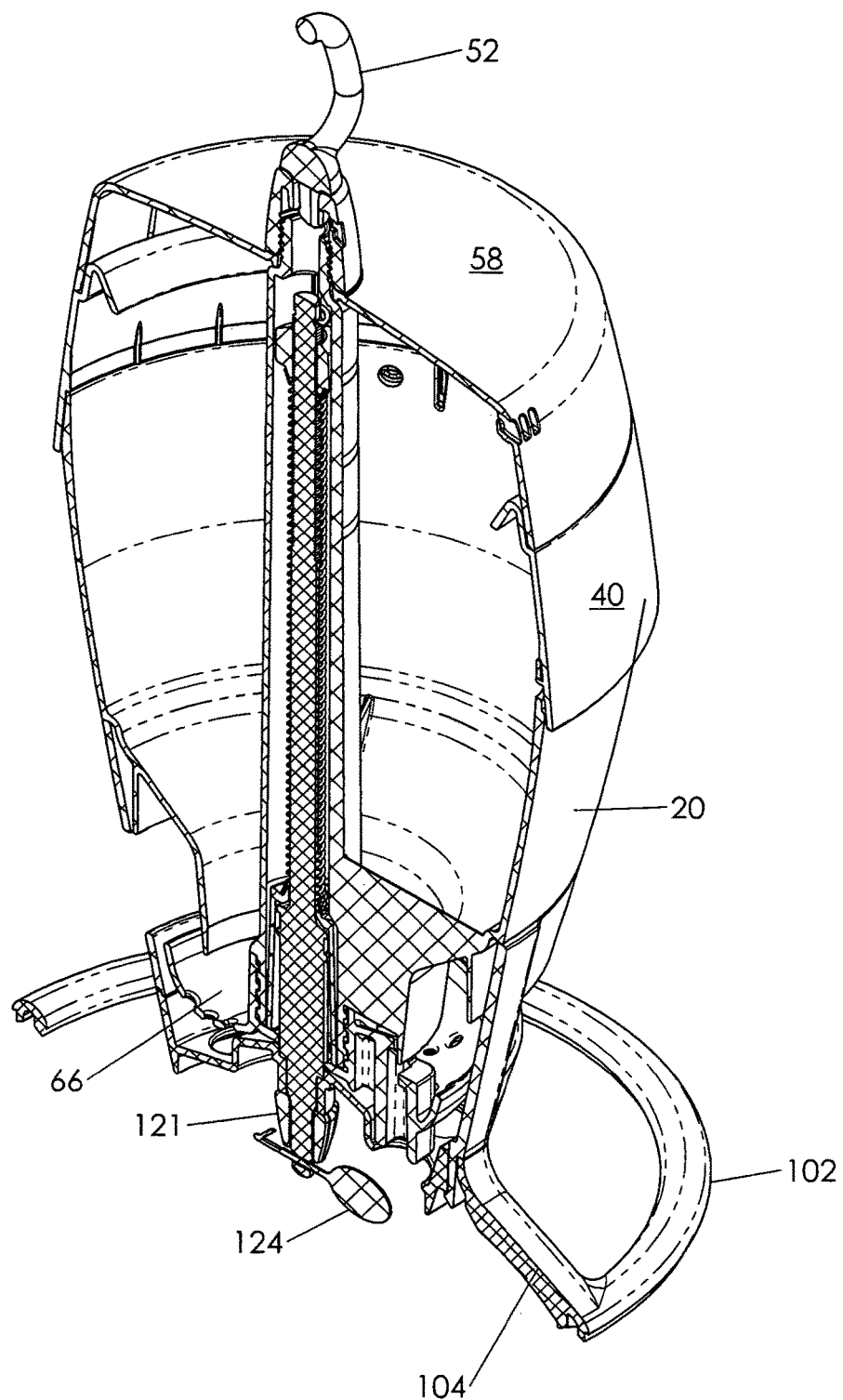
FIG. 15 is a perspective sectional view of the bird feeder.
Figure 16:
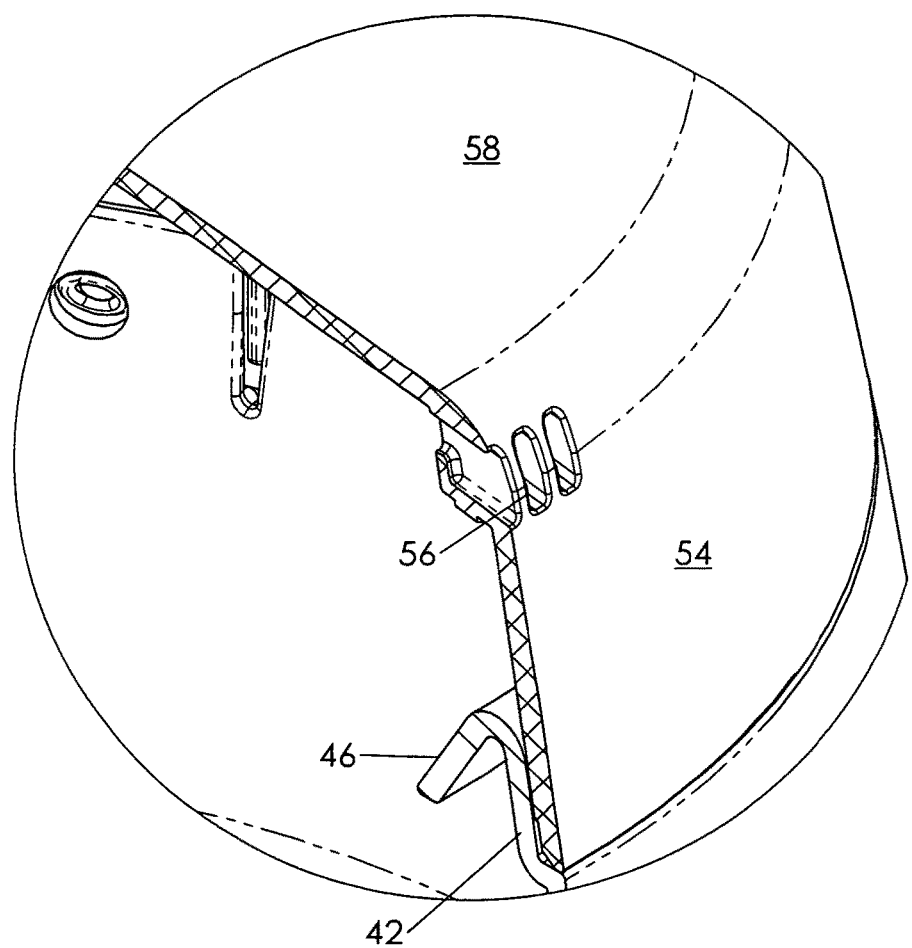
FIG. 16 is a sectional view illustrating a portion of the cover and securement thereof.
Figure 17:
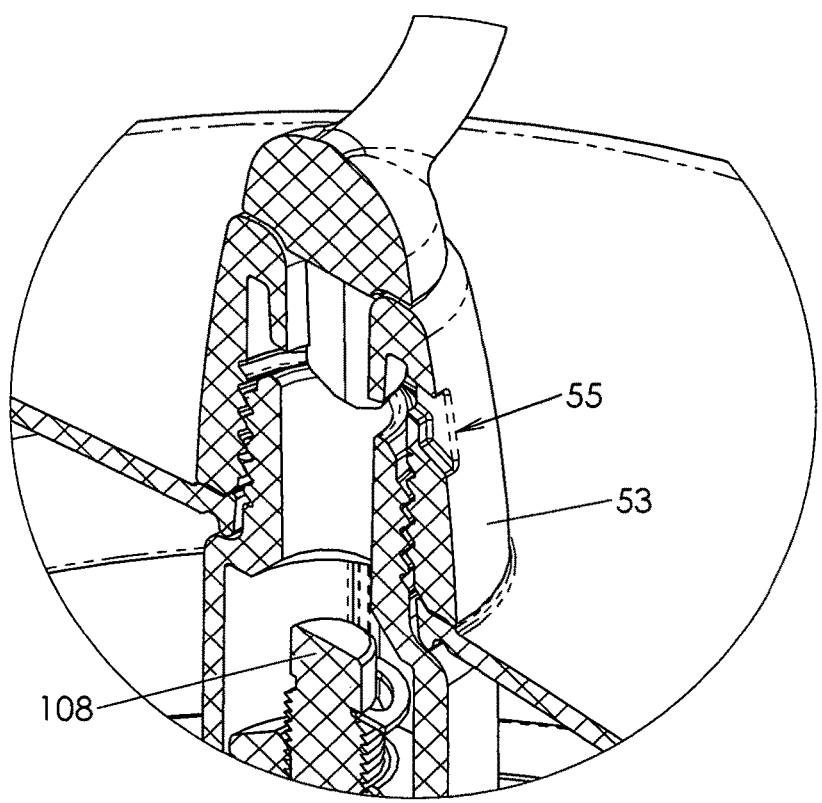
FIG. 17 is a partial sectional view illustrating the hanger and attachment thereof to the spring cartridge.
Figure 18:
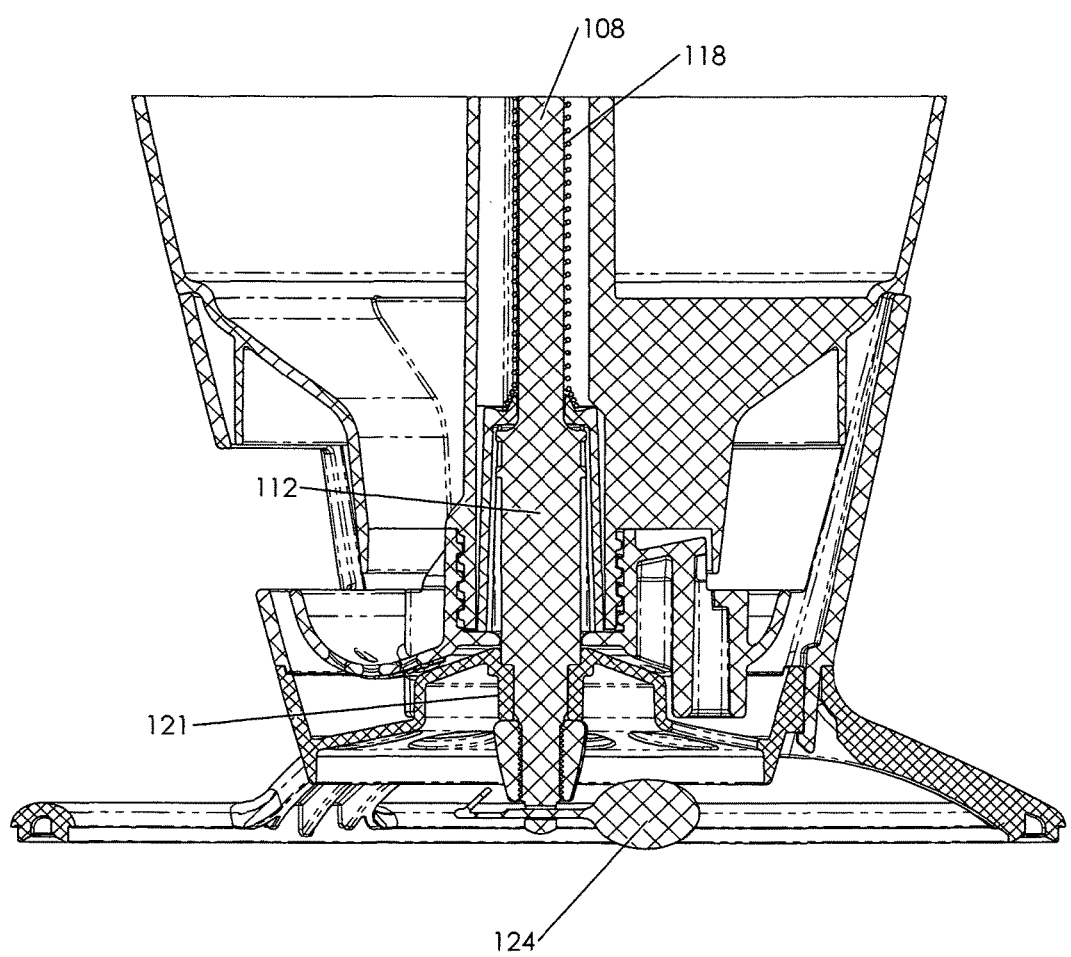
FIG. 18 is a side sectional view of the bottom portion of the feed container.
Figure 19:
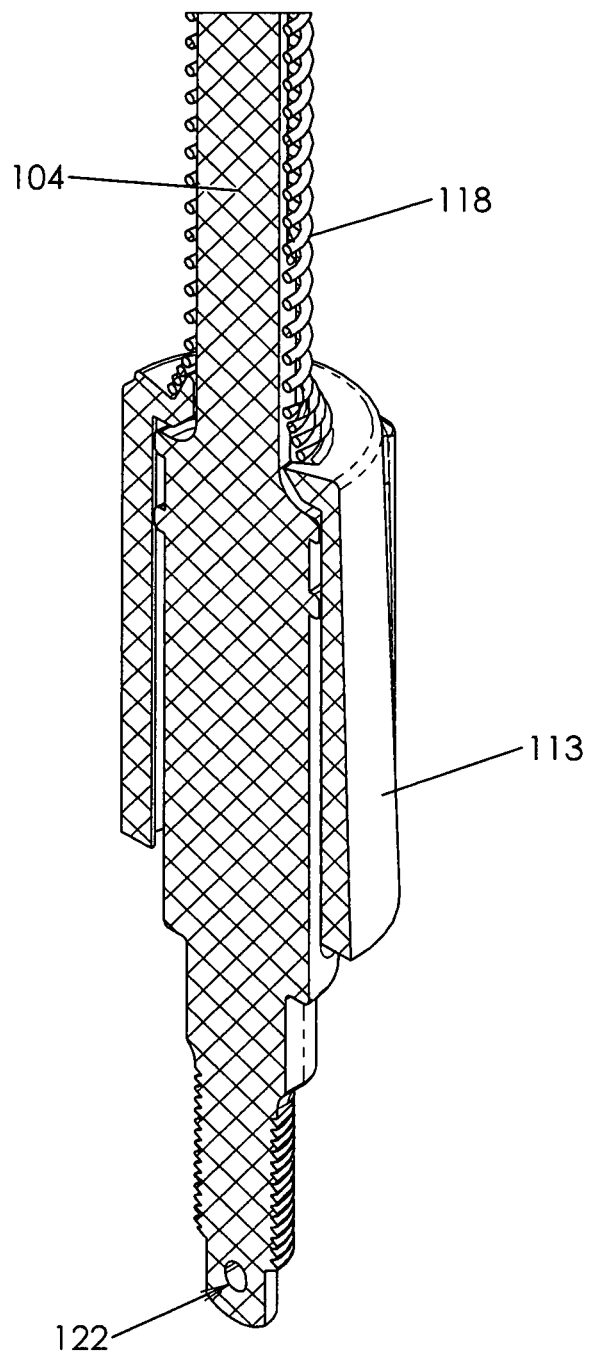
FIG. 19 is a sectional view of a portion of the spring cartridge in a normal unstressed position.
Figure 20:
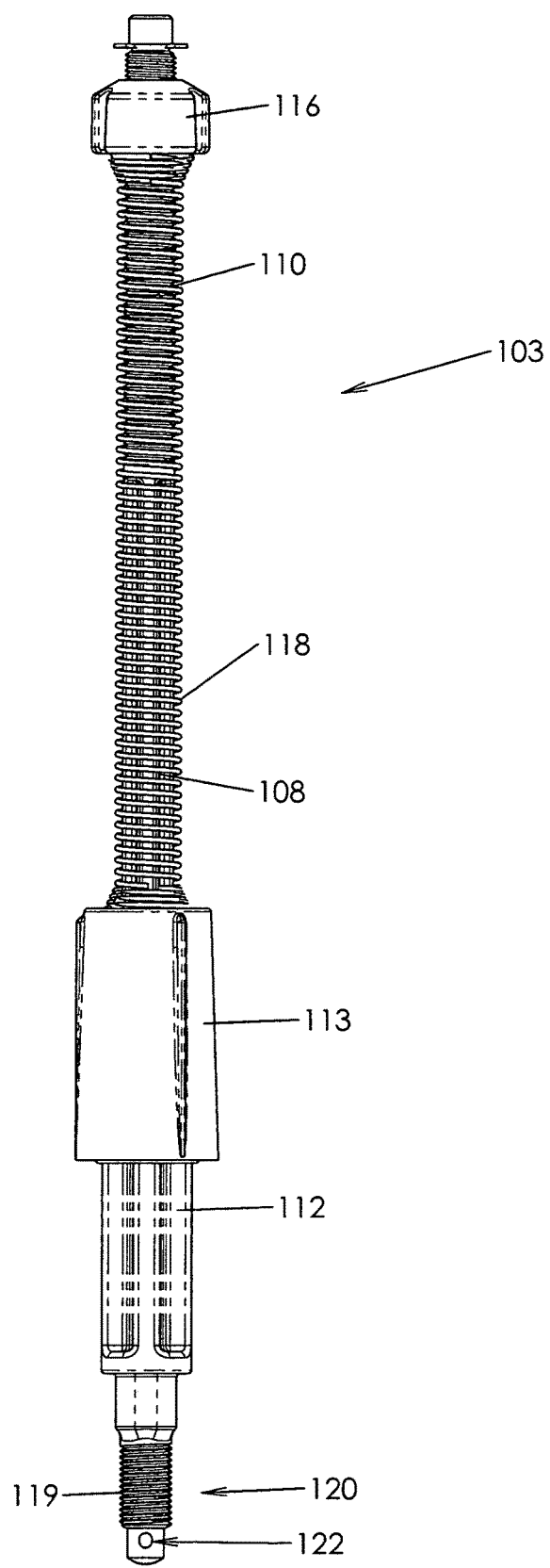
FIG. 20 is a side view of the spring cartridge when pressure is exerted thereon.
Figure 21:
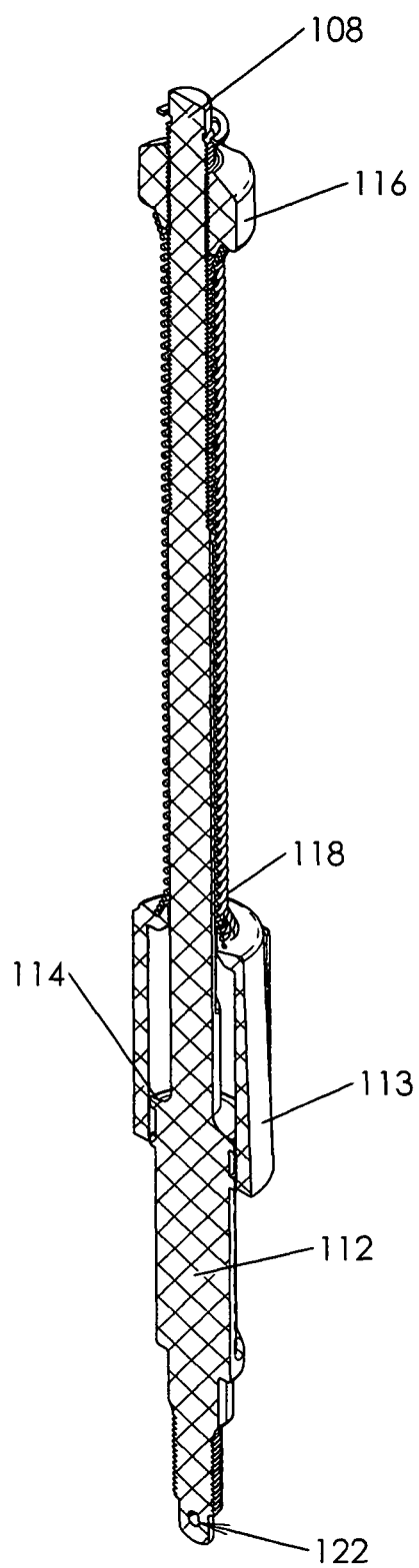
FIG. 21 is a sectional view thereof.
Figure 22:
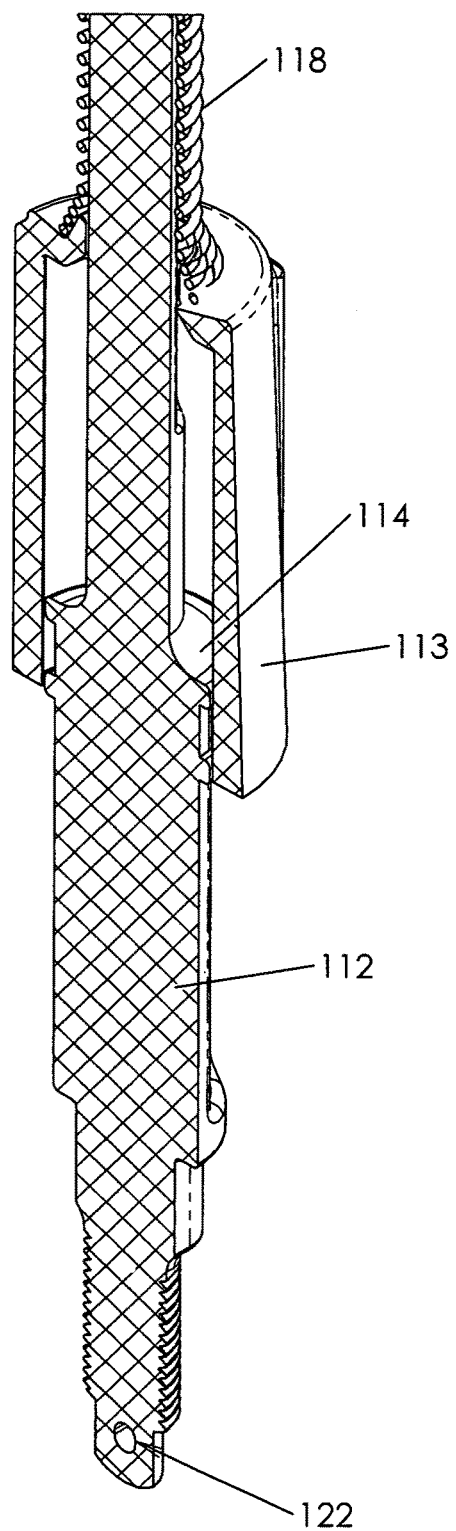
FIG. 22 is an enlarged view illustrating operation of the spring.

In assembly, the cartridge subassembly shown in FIG. 13 may be assembled and then bench tested to have the desired degree of tension. This is done by adjusting nut 116 as required.

Subsequently, upper body 14 may then be assembled with seed tray 16. The cartridge assembly would then be put into center tube 26. Seed tray 64 would then be screwthreadedly engaged with seed container 16. Shroud 18 may then be placed in position and held therein by nut 121 with pin 124 being placed in position. Cover 10 would then be placed in position and would be held in place by screwthreaded engagement of engagement portion 53.

The above arrangement permits adjustment, if required, of the tension of spring 118. Thus, rotation of the perch will cause rotation of the center rod 108 and permit the user to adjust the tension and thereby permit or deny access of a certain weight on the perch.

It will be understood that the above described embodiment is for purposes of illustration and that changes and modifications may be made thereto without departing from the spirit and scope of the invention.

I claim:

1. A bird feeder comprising:
a seed container;
a center tube within said seed container;
a seed tray screwthreadably engaged with a lower end of said seed container;
a cartridge spring assembly comprising:
a center rod having an enlarged lower end;
a cap sitting on said enlarged lower end;
a nut screwthreadably engaged with an upper end of said center rod;
a spring extending about said center rod;
an upper end of said spring being biased against said nut and a lower end of said spring being biased against said cap;
a cover, said cover having an aperture, said center tube passing through said aperture;
a hanger, said hanger being engaged with an upper portion of said center tube to thereby retain said cover in position;
a shroud having a perch member, said shroud and said cartridge spring assembly being attached whereby rotation of said perch member will cause a change in spring tension of said spring; and
a retainer secured to said lower end of said spring assembly to retain said shroud in position.

2. The bird feeder of claim 1 wherein said cover has ventilation apertures formed therein, said ventilation apertures communicating with said seed container, said seed tray having ventilation apertures formed therein, said ventilation apertures communicating with said seed container.

3. The bird feeder of claim 1 wherein said perch is circular.

4. The bird feeder of claim 1 wherein an upper surface of said cover is textured to have an uneven surface proximate said aperture to provide friction between said hanger and said cover.

5. The bird feeder of claim 1 wherein said seed tray includes a plurality of drainage apertures formed therein.

6. The bird feeder of claim 1 wherein said spring is tensioned between upper and lower stops to hold the spring under tension.

7. The bird feeder of claim 1 wherein said hanger includes ventilation apertures therein to provide ventilation for said cartridge spring assembly.

8. The bird feeder of claim 1 wherein said seed container comprises an upper body portion and a lower body portion, said lower body portion having an outer wall tapering inwardly and downwardly, said upper body portion having an outer wall tapering inwardly and upwardly.

9. A method of manufacturing the bird feeder of claim 1 comprising the step of preassembling said spring cartridge and testing said spring cartridge to ensure that the spring is calibrated to a desired tension prior to assembling said bird feeder.

* * * * *